April 25, 1950     W. T. PICKING     2,505,628
METHOD OF AND MEANS FOR PRODUCING
KNOTTED PILE FABRICS Filed Feb. 15, 1946     5 Sheets-Sheet 1

INVENTOR
William Thomas Picking
By
his ATTORNEY.

April 25, 1950 W. T. PICKING 2,505,628
METHOD OF AND MEANS FOR PRODUCING
KNOTTED PILE FABRICS
Filed Feb. 15, 1946 5 Sheets-Sheet 2

INVENTOR
William Thomas Picking
BY
his ATTORNEY.

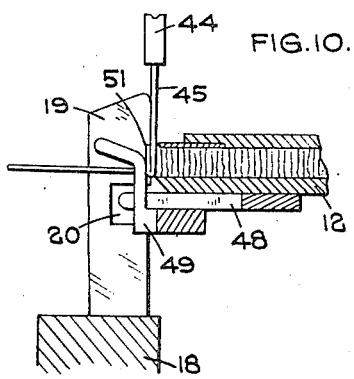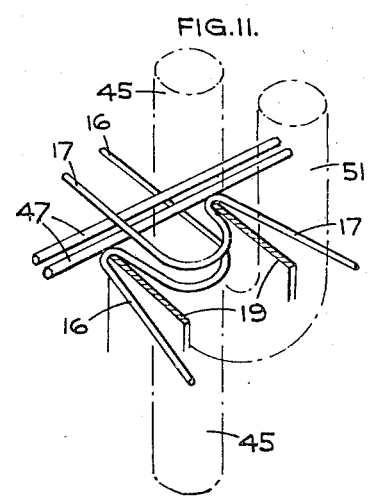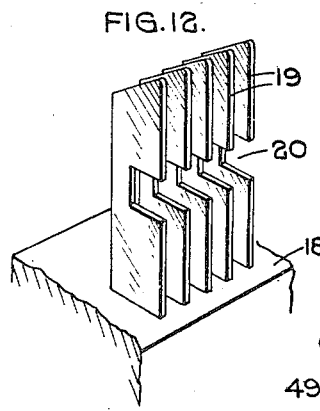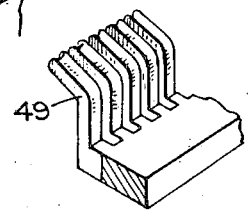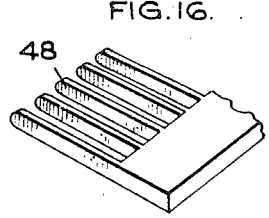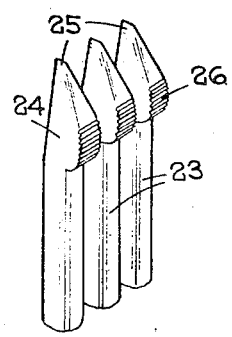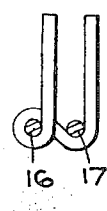

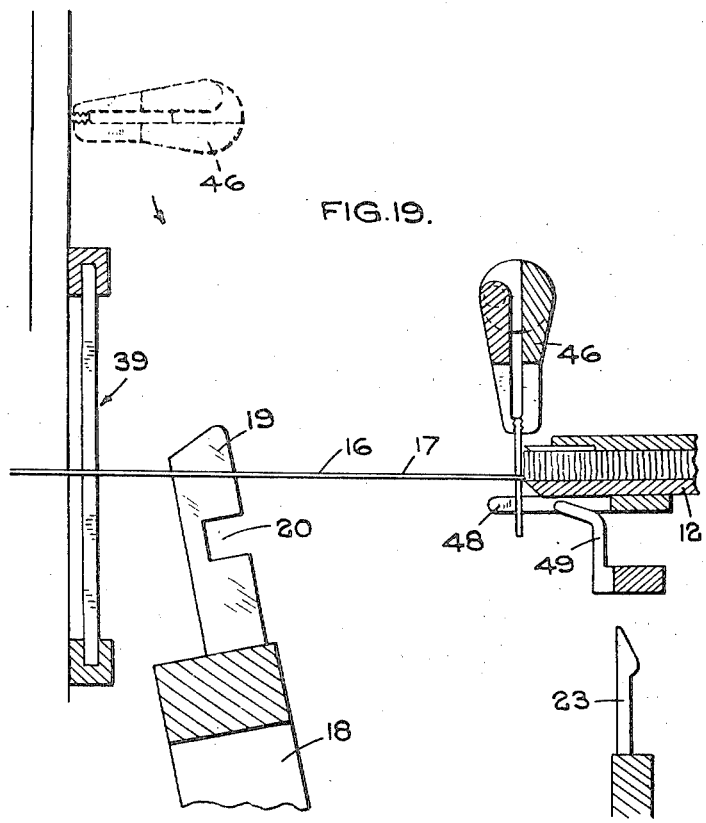

Patented Apr. 25, 1950

2,505,628

UNITED STATES PATENT OFFICE 2,505,628

METHOD OF AND MEANS FOR PRODUCING KNOTTED PILE FABRICS

William Thomas Picking, Westville, Bewdley Hill, Kidderminster, England

Application February 15, 1946, Serial No. 647,772
In Great Britain October 14, 1944

Section 1, Public Law 690, August 8, 1946
Patent expires October 14, 1964

15 Claims. (Cl. 139—5)

This invention relates to a method of, and means for, producing knotted pile fabrics, and has for its object the production on a power loom of a pile fabric wherein the inserted lengths of pile yarn engage the warps to form Persian-type knots.

According to the present invention, I employ a method of weaving knotted pile fabrics comprising the steps of placing a pair of warps between each two dents of a main lay, moving the pairs of warps laterally so that they engage the sides of the dents of the main lay, inserting lengths of pile yarn between the pairs of warps, raising each pair of warps out of its opening in the main lay, moving them laterally in opposite directions, and lowering them, one into a lay opening at one side of the opening in which they were originally disposed, and the other into the lay opening at the opposite side of said opening so that each warp becomes crossed with a warp of the next pair, moving the main lay forwardly so that the crossed warps grip the pile yarns and press them against the fell of the fabric, turning up the ends of the pile yarns behind the crossed parts of the warps, uncrossing the warps by lifting them out of the main lay and allowing them to move laterally and then lowering them again, forming a shed in the warp, inserting weft, and beating up the weft.

The weft may be beaten up by an auxiliary lay having headed dents which apply the upward pull to the turned up ends of the pile yarns to tighten the knots.

The crossing and uncrossing of the warps may be effected by providing a comb behind the main lay, said comb having flexible dents which are moved from side to side to produce the lateral movements of the warps.

This comb may be used in combination with the main lay, the dents of which are unconnected at their upper ends, so that the warps can be lifted out of one opening, moved laterally and lowered again into a different lay opening.

The comb having the flexible dents may be operated to move the warps first to one side of the normal position and then to the opposite side of the normal position, and then back to the side to which they were first moved but through a greater distance than the first movement, and finally back to the normal position.

This comb may have each dent formed as a pair of thin blades.

The means employed for carrying out the manufacture may incorporate a supplementary lay having headed dents which are offset forwardly and which are roughened for engaging the turned up ends of the pile yarns, and this supplementary lay is given an upward movement at the forward end of its stroke for pulling the knots tight.

The loom employed for carrying out the process may include a fixed or moving positioning comb for receiving and holding in position the pile yarns, the teeth of which comb project under the fell of the fabric.

The loom may also include a tuft comb for turning up the lower ends of the inserted pile yarns, and the teeth of this comb may be grooved on their upper sides for ensuring proper location of the yarns. These teeth have an upward movement during which they pass between the teeth of the yarn positioning comb. The forward edges of the dents of the main lay may be recessed to allow them to clear the ends of the teeth of the positioning comb when the main lay moves forwardly.

Referring to the drawings:

Figure 10 is a sectional view in side elevation showing the position of the parts when the next step has been completed.

Figure 11 is a perspective view showing certain of the parts in the same position as in Figure 10.

Figure 12 is a perspective view showing a part of the main lay.

Figure 13 is a perspective view showing some of the dents of the auxiliary lay.

Figure 14 is a perspective view showing a part of the comb used for turning up the ends of the pile yarns.

Figure 15 is a sectional view upon an enlarged scale of one of the dents of the comb shown in Figure 14.

Figure 16 is a perspective view showing a part of the fixed or moving comb.

Figure 17 is a detailed view showing one of the knots formed by the method according to the present invention.

Figure 18 is a view showing the structure of the fabric manufactured in accordance with the invention.

Figure 19 is a view in side elevation showing the arrangement when the pile yarns are inserted by means of grippers.

Figure 1:
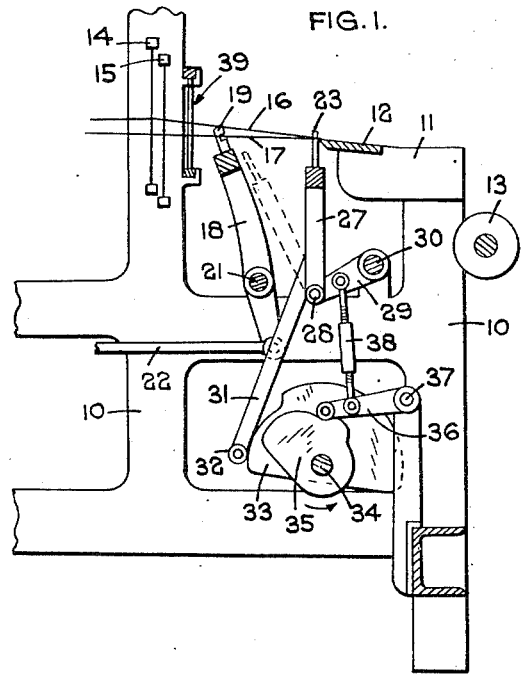
Figure 1 is a view in side elevation showing in outline a loom for carrying out the method according to the invention.
Figure 2:
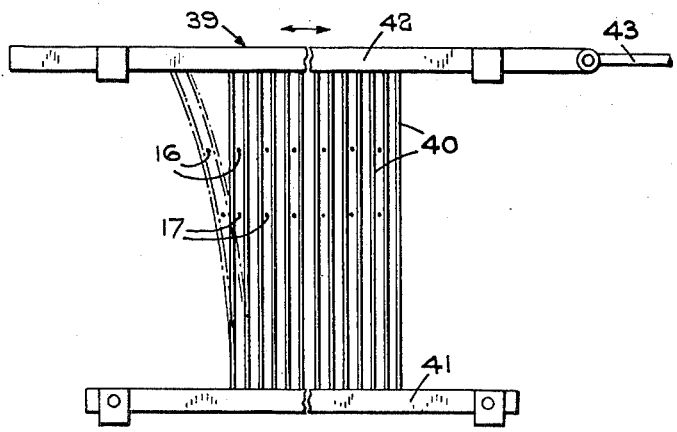
Figure 2 is a front view of the comb having the flexible dents.

In the construction illustrated, the loom frame is shown at 10 and is provided with a breast beam 11 and a plate 12 over which the completed fabric passes to be wound on a roller 13 in the well-known way.

The usual heddles 14, 15 are provided for controlling the upward and downward movement of the warps 16, 17 and the main lay is shown at 18. This lay is provided with dents 19 (see particularly Figure 12) which are unconnected at their upper ends. The dents are slotted as shown at 20 at their forward edges. These dents are carried by the levers 18 pivoted at 21, and the lay is operated by connecting rods, one of which is shown at 22. These rods are reciprocated periodically at the right times by means of a cam operated from the driving shaft of the loom in the well-known manner to produce the oscillation of the levers 18.

The loom further includes an auxiliary lay 23 operating in advance of the main lay, and the dents of this auxiliary lay are provided with offset heads 24 which are pointed at their upper ends as shown at 25 in order that they may more easily penetrate between the warps.

The offset heads 24 are provided with rounded surfaces 26 which are horizontally serrated as shown.

The dents of the auxiliary lay 23 are carried on levers 27 pivoted at 28 to cranks 29 pivoted to the loom at 30, and the levers 27 are provided with arms 31 carrying rollers 32 at their free ends engaging cams 33 mounted on a shaft 34. Also mounted on this shaft are secondary cams 35 operating cranks 36 pivoted to the frame of the loom at 37, the cranks 36 being connected by adjustable links 38 to the cranks 29.

The shaft 34 or the cams thereon are driven continuously through suitable gearing from the driving shaft of the loom to cause the levers 27 to oscillate around the pivot 28, and at the forward end of each movement the levers 27 are given an upward movement by the cam 35, so that the serrated surfaces 26 can engage the pile yarns and apply an upward force thereto for pulling the knots tight.

The frame of the loom behind the main lay 18 is provided with a comb 39 having flexible dents 40. Each dent may be formed as two thin blades, and these blades are mounted in a rail 41 at the bottom and can be bent from side to side by attaching them to a rail 42 at the top to which a reciprocating motion is applied through a link 43 operated by a cam or other suitable means driven from the power shaft of the machine.

Figure 7:
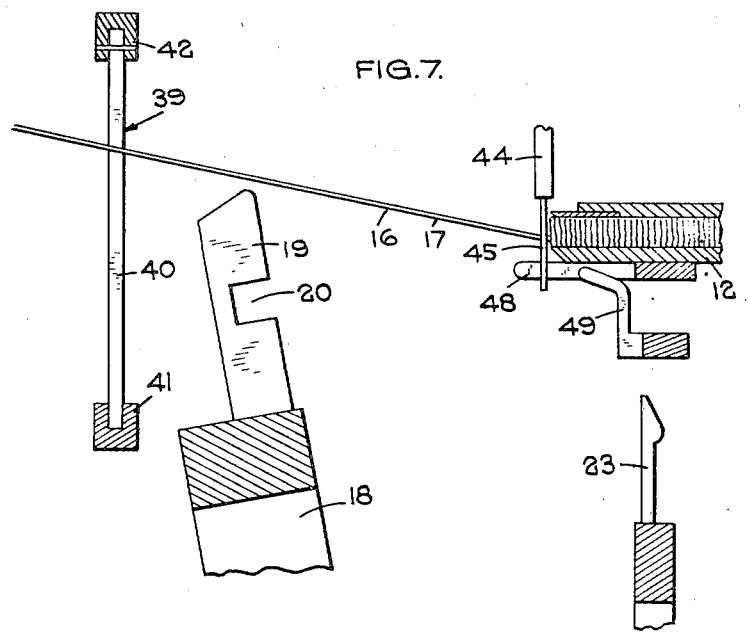
Figure 7 is a sectional view in side elevation showing the position of the parts at the completion of the next step in the cycle of operations.
Figure 8:
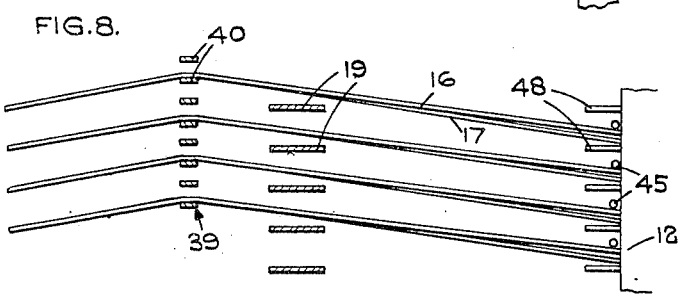
Figure 8 is a plan view corresponding with Figure 7.
Figure 9:
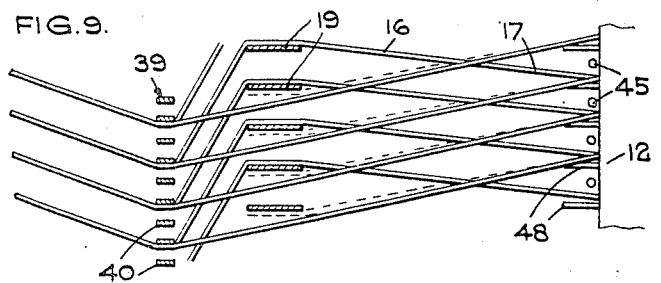
Figure 9 is a plan view illustrating the position when the next step in the sequence of operations has been completed.

The lengths of pile yarn can be inserted by the tube method illustrated at 44 in Figure 7, in which case the pile yarns 45 are inserted with a downward movement between the warps 16, 17 and held tightly, after which the tubes 44 are drawn upwardly and the pile yarns are severed, or the pile yarns may be inserted by grippers 46 of well-known construction, in which case the grippers withdraw a suitable length of pile yarn which is severed and then conveyed to the fabric as indicated in Figure 19. In another method the pile yarns may be inserted by using needles.

Figure 3:
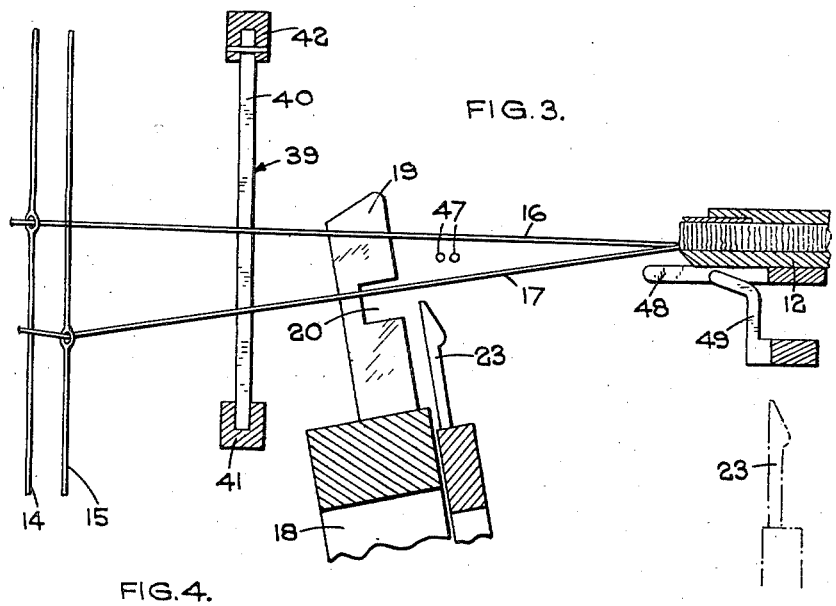
Figure 3 is a sectional view in side elevation showing the position of the parts at the beginning of the cycle of operations.
Figure 4:
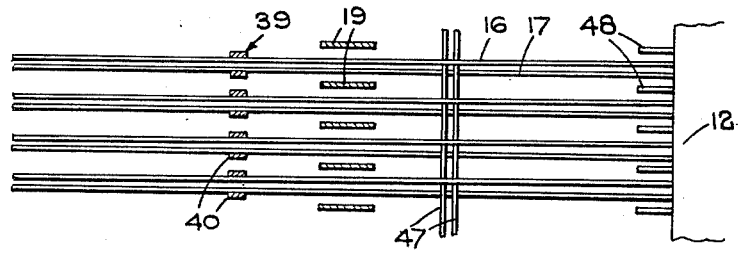
Figure 4 is a plan view corresponding with Figure 3.

Referring particularly to Figures 3 to 11, in the position shown in Figure 3, the heddle 15 is down, and the heddle 14 is in the centre or normal position.

Figure 5:
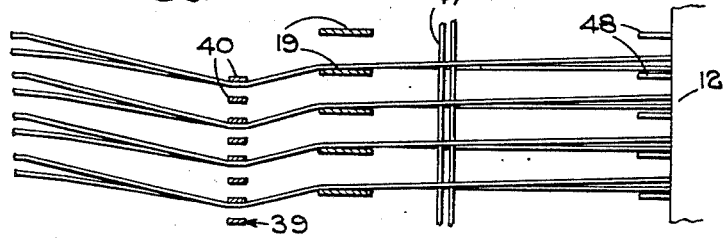
Figure 5 is a plan view showing the position after the first step in the cycle of operations.

The heddle 15 is then raised to the central position, and during its movement the flexible dents 40 are moved one step to the left looking from the front of the machine and press the warp threads 16, 17 against the sides of the dents 19 of the main lay (see Figure 5).

Figure 6:
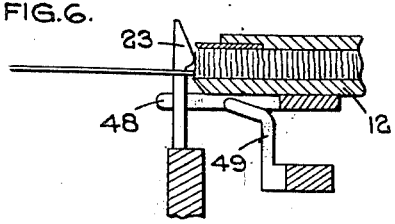
Figure 6 is a view in sectional side elevation showing the position of certain of the parts when the next step has been completed.

The auxiliary lay 23 now engages the back of the weft 47 and moves forward to the position shown in Figure 6. At the end of the forward movement, the auxiliary lay is raised by the cam 35, and the serrated surfaces 26 engage the pile yarns with an upward movement and pull tight the knots previously made. The dents of the auxiliary lay when in the forward position also serve to hold the warps apart for receiving the pile yarns. If the pile yarns are inserted by means of tubes the tubes move down between the warps before the auxiliary lay leaves the position shown in Figure 6, and the auxiliary lay then moves back somewhat and downwardly and forwardly into the position shown in the chain dot lines in Figure 3. These movements are imparted to the auxiliary lay by the cams 33 and 35, and while they are taking place the tubes holding the pile yarns are moving forwardly (see Figures 7 and 8).

If the pile yarns are inserted by using tubes 44, the tubes enter the warp, move forwardly to the fell of the fabric and then out of the warp, leaving the pile yarn projecting downwardly through the warp and between the teeth of a positioning comb 48 arranged under the plate 12. This positioning comb is shown in detail in Figure 16. During the movement of the yarn inserting tubes, the heddle frames lift the warps out of the main lay as shown in Figure 7.

The flexible dents 40 of the comb 39 now move the warps one space to the right of the initial position (see Figure 8), and the heddle frame controlling the heddles 14 drops down to the central position. The flexible dents 40 now move two spaces to the left of the original position (see Figure 9) and then the heddle frame controlling the heddles 15 drops to the central position. As the warps pass down the curve of the flexible dents, they are guided into the main lay.

As a result of these operations, one warp of each pair is crossed with one warp of the next pair. This can be seen clearly in Figure 9.

The lay now moves forwardly to the position shown in Figures 10 and 11, causing the warps to grip the inserted pile yarns 45, and to hold them against the fell of the fabric.

While the pile yarns are thus held, the tubes 44 rise to the required height and a tuft comb 49 is moved forwardly and upwardly. This tuft comb is shown in Figures 3, 7, 10, 14 and 15, and its teeth are of inverted L shape and are formed with grooves 50 which engage partially around the underside of each of the pile yarns, so that the pile yarns are effectively positioned each in one tooth of the tuft comb. When the tuft comb has moved into the position shown in Figure 10, the ends 51 of the pile yarns are turned upwardly around the crossed parts of the warps. The teeth of the tuft comb pass upwardly between the teeth of the positioning comb 48.

The main lay 18 now moves backwardly and the tuft comb 49 moves back into the position shown in Figure 3. When the lay has moved back about half its distance, a guillotine or other cutting device severs the pile yarns.

The auxiliary lay 23 now moves back into the position shown in Figure 3.

The heddle frames controlling the heddles 14 and 15 move upwardly, bringing the warps out of the main lay 18 and allowing these warps to return to their normal alignment, i. e. allowing them to become uncrossed. The flexible dents of the comb 39 now return to the vertical position, and the heddle frame controlling the heddles 15 drops to the central position, and the heddle frame controlling the heddles 14 drops to the bottom position, and the weft 47 is inserted.

The cycle of operations is then repeated.

Instead of inserting the pile yarns by means of tubes, they may be inserted by the grippers 46 which are operated in the known manner as shown in Figure 19. When working with grippers or with needles, the cycle of operations remains as described.

What I claim then is:

1. A method of weaving knotted pile fabrics, comprising the steps of placing a pair of warps between each two dents of a main lay, moving the pairs of warps laterally so that they engage the sides of the dents of the main lay, inserting lengths of pile yarn between the pairs of warps, raising each pair of warps out of its opening in the main lay, moving them laterally in opposite directions, and lowering them, one into a lay opening at one side of the opening in which they were originally disposed, and the other into the lay opening at the opposite side of said opening, so that each warp becomes crossed with a warp of the next pair, moving the main lay forwardly so that the crossed warps grip the pile yarns and press them against the fell of the fabric, turning up the ends of the pile yarns behind the crossed parts of the warps, uncrossing the warps by lifting them out of the main lay and allowing them to move laterally, and then lowering them again, forming a shed in the warp, inserting weft, and beating up the weft and pulling the pile knots tight by applying an upward force to the upwardly turned ends of the pile yarns.

2. A method of weaving knotted pile fabrics, comprising the steps of placing a pair of warps between each two dents of a main lay, moving the pairs of warps laterally so that they engage the sides of the dents of the main lay, inserting lengths of pile yarn between the pairs of warps, raising each pair of warps out of its opening in the main lay, moving them laterally in opposite directions, and lowering them, one into a lay opening at one side of the opening in which they were originally disposed, and the other into the lay opening at the opposite side of said opening so that each warp becomes crossed with a warp of the next pair, moving the main lay forwardly so that the crossed warps grip the pile yarns and press them against the fell of the fabric, turning up the ends of the pile yarns behind the crossed parts of the warps, uncrossing the warps by lifting them out of the main lay and allowing them to move laterally, and then lowering them again, forming a shed in the warp, inserting weft in the shed and beating up the weft by an auxiliary lay having headed dents which apply an upward pull to the turned up ends of the pile yarns to tighten the knots.

3. A method of weaving knotted pile fabrics, comprising the steps of placing a pair of warps between each two dents of a main lay, moving the pairs of warps laterally so that they engage the sides of the dents of the main lay, inserting lengths of pile yarn between the pairs of warps, raising all the pairs of warps out of the openings in the main lay, moving them laterally in the opposite direction from the first lateral movement and by a distance greater than the first lateral movement, lowering one warp of each pair into the main lay, moving the remaining warps laterally in the direction taken by the first lateral movement but through a greater distance, lowering the said remaining warps into the main lay, whereby one warp of each pair is crossed with one warp of the next pair, moving the crossing portion of the warps forwardly to make them grip the pile yarns, turning the lower portion of the pile yarns upwardly behind the crossing portion of the warps, raising the warps out of the main lay so as to allow the warps to return to their normal alignment, forming a shed in the warps, inserting weft in the shed, and beating up the weft.

4. A method of weaving knotted pile fabrics, comprising the steps of placing a pair of warps between each two dents of a main lay, moving the pairs of warps laterally so that they engage the sides of the dents of the main lay, inserting lengths of pile yarn between the pairs of warps, raising all the pairs of warps out of the openings in the main lay, moving them laterally in the opposite direction from the first lateral movement and by a distance greater than the first lateral movement, lowering one warp of each pair into the main lay, moving the remaining warps laterally in the direction taken by the first lateral movement but through a greater distance, lowering the said remaining warps into the main lay, whereby one warp of each pair is crossed with one warp of the next pair, moving the crossing portion of the warps forwardly to make them grip the pile yarns, turning the lower portion of the pile yarns upwardly behind the crossing portion of the warps, raising the warps out of the main lay so as to allow the warps to return to their normal alignment, forming a shed in the warps, inserting weft in the shed, beating up the weft, and applying tension to the turned up ends of the pile yarns.

5. A method of weaving knotted pile fabrics, comprising the steps of placing a pair of warps between each two dents of a main lay, moving the pairs of warps laterally so that they engage the sides of the dents of the main lay, inserting lengths of pile yarn between the pairs of warps, supporting said pile yarns, below the said warps, against lateral movement, raising all the pairs of warps out of the openings in the main lay, moving them laterally in the opposite direction from the first lateral movement and by a distance greater than the first lateral movement, lowering one warp of each pair into the main lay, moving the remaining warps laterally in the direction taken by the first lateral movement but through a greater distance, lowering the said remaining warps into the main lay, whereby one warp of each pair is crossed with one warp of the next pair, moving the crossing portion of the warps forwardly to make them grip the pile yarns, turning the lower portion of the pile yarns upwardly behind the crossing portion of the warps, raising the warps out of the main lay so as to allow the warps to return to their normal alignment, forming a shed in the warps, inserting weft in the shed and beating up the weft.

6. In a loom for weaving pile fabrics, a main lay constructed with the dents unconnected at the top, a comb behind the main lay having dents which are laterally movable, an auxiliary lay in front of the main lay, a tuft comb having upwardly and rearwardly directed teeth, and a positioning comb disposed near the tuft comb, the teeth of one of these combs being adapted to pass between the teeth of the other.

7. A method of weaving knotted pile fabrics, comprising the steps of placing a pair of warps between each two dents of a main lay, moving the pairs of warps laterally so that they engage the sides of the dents of the main lay, inserting lengths of pile yarn between the pairs of warps, raising each pair of warps out of its opening in the main lay, moving them laterally in opposite directions, and lowering them, one into a lay opening at one side of the opening in which they were originally disposed, and the other into the lay opening at the opposite side of said opening, so that each warp becomes crossed with a warp of the next pair, moving the main lay forwardly so that the crossed warps grip the pile yarns and press them against the fell of the fabric, turning up the ends of the pile yarns behind the crossed parts of the warps, uncrossing the warps by lifting them out of the main lay and allowing them to move laterally, and then lowering them again, forming a shed in the warp, inserting weft, and beating up the weft.

8. A method of weaving knotted pile fabrics, comprising the steps of placing a pair of warps between each two dents of a main lay, moving the pairs of warps laterally so that they engage the sides of the dents of the main lay, inserting lengths of pile yarn between the pairs of warps, raising each pair of warps out of its opening in the main lay moving them laterally in opposite directions, and lowering them, one into a lay opening at one side of the opening in which they were originally disposed, and the other into the lay opening at the opposite side of said opening so that each warp becomes crossed with a warp of the next pair, moving the main lay forwardly so that the crossed warps grip the pile yarns and press them against the fell of the fabric, turning up the ends of the pile yarns behind the crossed parts of the warps, uncrossing the warps by lifting them out of the main lay and allowing them to move laterally, and then lowering them again, forming a shed in the warp, inserting weft in the shed and beating up the weft by an auxiliary lay.

9. A method of weaving knotted pile fabrics, comprising the steps of placing a pair of warps between each two dents of a main lay, moving the pairs of warps laterally so that they engage the sides of the dents of the main lay, inserting lengths of pile yarn between the pairs of warps, raising all the pairs of warps out of the openings in the main lay, moving them laterally in the opposite direction from the first lateral movement and by a distance greater than the first lateral movement, lowering one warp of each pair into the main lay, moving the remaining warps laterally in the direction taken by the first lateral movement but through a greater distance, lowering the said remaining warps into the main lay, whereby one warp of each pair is crossed with one warp of the next pair, moving the crossing portion of the warps forwardly to make them grip the pile yarns, turning the lower portion of the pile yarns upwardly behind the crossing portion of the warps, raising the warps out of the main lay so as to allow the warps to return to their normal alignment, forming a shed in the warps, inserting weft in the shed, and beating up the weft.

10. A method of weaving knotted pile fabrics comprising the steps of placing a pair of warps between each two dents of a main lay, inserting lengths of pile yarn between the pairs of warps, raising all the pairs of warps out of the openings in the main lay, moving them laterally to one side of their initial position, lowering one warp of each pair into the main lay, moving the remaining warps laterally in the direction opposite to that of their first lateral movement and by a greater distance, lowering the said remaining warps into the main lay, whereby one warp of each pair is crossed with one warp of the next pair, advancing the main lay until its dents press hard against the fell on either side of the pile yarn so that the crossing points of the warps grip the pile yarns firmly, turning the lower portions of the pile yarns upwardly behind the crossing portions of the warps, moving the main lay backwardly and raising the warps out of the main lay so as to allow the warps to return to their normal alignment, lowering the warps into the main lay again, forming a shed in the warps, inserting weft in the shed and beating up the weft.

11. A method of weaving knotted pile fabrics comprising the steps of placing a pair of warps between each two dents of a main lay, inserting lengths of pile yarn between the pairs of warps, raising all the pairs of warps out of the openings in the main lay, moving the warps laterally, whereby one warp of each pair is crossed with one warp of the next pair, advancing the main lay until its dents press hard against the fell on either side of the pile yarn so that the crossing points of the warps grip the pile yarns firmly, turning the lower portions of the pile yarns upwardly behind the crossing portions of the warps, moving the main lay backwardly, lowering the warps into the main lay again, forming a shed in the warps, inserting weft in the shed and beating up the weft.

12. A method of weaving knotted pile fabrics comprising the steps of placing a pair of warps between each two dents of a main lay, inserting lengths of pile yarn between the pairs of warps, raising all the pairs of warps out of the openings in the main lay, moving the warps laterally, whereby one warp of each pair is crossed with one warp of the next pair, advancing the main lay until its dents press hard against the fell on either side of the pile yarn so that the crossing points of the warps grip the pile yarns firmly, turning the lower portions of the pile yarns upwardly behind the crossing portions of the warps by a tuft comb the teeth of which pass between the warps, moving the main lay backwardly while the teeth of the tuft comb remain in position between the warps and hold the upturned ends of the pile yarns in position, lowering the warps into the main lay again, forming a shed in the warps, inserting weft in the shed, beating up the weft and removing the teeth of the tuft comb from between the warps just before the completion of the beat up.

13. A method of weaving knotted pile fabrics comprising the steps of placing a pair of warps between each two dents of a main lay, inserting lengths of pile yarn between the pairs of warps, raising all the pairs of warps out of the openings in the main lay, moving the warps laterally whereby one warp of each pair is crossed with one warp of the next pair, advancing the main lay until its dents press hard against the fell on either side of the pile yarn so that the crossing points of the warps grip the pile yarns firmly, turning the lower portions of the pile yarns upwardly behind the crossing portions of the warps by a tuft comb, the teeth of which pass between the warps, moving the main lay backwardly while the teeth of the tuft comb remain in position between the warps and hold the upturned ends of the pile yarns in position, lowering the warps into the main lay again, forming a shed in the warps, inserting weft in the shed, beating up the weft by an auxiliary lay, removing the teeth of the tuft comb from between the warps just before the completion of the beat up and leaving the dents of the auxiliary lay in position between the warps at the fell to hold the warps apart until the next row of pile warps is inserted.

14. In a loom for weaving pile fabrics, a main lay constructed with all its dents unconnected at the top, a comb behind the main lay having dents which are laterally movable, an auxiliary lay in front of the main lay, a tuft comb having upwardly and rearwardly directed teeth, a plate over which the completed fabric passes, and a positioning comb projecting rearwardly from the edge of said plate, the teeth of one of these combs being adapted to pass between the teeth of the other, the dents of the main lay being slotted at their forward edges to allow them to move up to said plate without striking said positioning comb.

15. A method of weaving knotted pile fabrics comprising the steps of placing a pair of warps between each two dents of a main lay, inserting lengths of pile yarn between the pairs of warps, raising all the pairs of warps out of the openings in the main lay, moving them laterally to one side of their initial position, lowering one warp of each pair into the main lay into an opening of the lay at one side of the lay opening in which they were originally situated, moving the remaining warps laterally in the direction opposite to that of their first lateral movement and by a greater distance, lowering the said remaining warps into the main lay into a lay opening on the opposite side of the lay opening in which they were originally situated, whereby one warp of each pair is crossed with one warp of the next pair, and two dents of the lay are disposed between the said pair of warps, advancing the main lay until its dents press hard against the fell on either side of the pile yarn so that the crossing points of the warps grip the pile yarns firmly, turning the lower portions of the pile yarns upwardly behind the crossing portions of the warps, moving the main lay backwardly and raising the warps out of the main lay so as to allow the warps to return to their normal alignment, lowering the warps into the main lay again, forming a shed in the warps, inserting weft in the shed and beating up the weft.

WILLIAM THOMAS PICKING.

REFERENCES CITED

The following references are of record in the file of this patent:

UNITED STATES PATENTS

| Number | Name | Date |
|---|---|---|
| 468,479 | Bolletin | Feb. 9, 1892 |
| 627,440 | Patrone | June 20, 1899 |
| 712,888 | Wyman | Nov. 4, 1902 |
| 858,962 | Dalkranian | July 2, 1907 |
| 858,963 | Dalkranian | July 2, 1907 |
| 882,454 | Dalkranian | Mar. 17, 1908 |
| 982,862 | Peterson | Jan. 31, 1911 |
| 1,849,534 | Peterson | Mar. 15, 1932 |
| 1,987,973 | Rice | Jan. 15, 1935 |
| 1,994,536 | Rice | Mar. 19, 1935 |